July 1, 1941.  F. F. L. GIROUD ET AL  2,247,578
DIFFERENTIAL TRANSMISSION
Filed Feb. 21, 1940  3 Sheets-Sheet 2

INVENTORS
Francisco Felipe Lazaga Giroud
Basilio Juan José Giroud

Patented July 1, 1941

2,247,578

UNITED STATES PATENT OFFICE 2,247,578

DIFFERENTIAL TRANSMISSION

Francisco Felipe Lázaga Giroud, La Vibora, Habana, and Baudilio Jesús Piqué Giroud, Reparto Ampliacion de Almendares, Marianao, Cuba Application February 21, 1940, Serial No. 320,076

20 Claims. (Cl. 74—265)

Our invention relates to means for producing changes of power and motion. It has been more particularly designed as an agent to produce changes of power and motion in a transmission system.

Our invention may be described as some improvements to be used instead of the shift gear transmission commonly used in automobiles, tractors and other engines and machines.

The objects of our invention are: first, to provide a device which will maintain all the gears engaged; second, a device which regulates the power and motion transmitted from a driving shaft to a transmission shaft; third, means so that the transmitted motion be in same direction as the initial motion; fourth, means to reverse the direction of the transmitted motion; fifth, means so that the motion transmitted, "in direct," by a clutch system, be without the running of gears; sixth, means to produce the intermediate changes of power and motion by a system of brakes; seventh, means to have the entire device supported by the central shaft.

Other objects and advantages will be understood from the following description. We have attained these objects by means of the mechanism illustrated in the accompanying drawings, in which.

Similar numerals and letters refer to the same or similar parts throughout the different figures.

Figure 1:
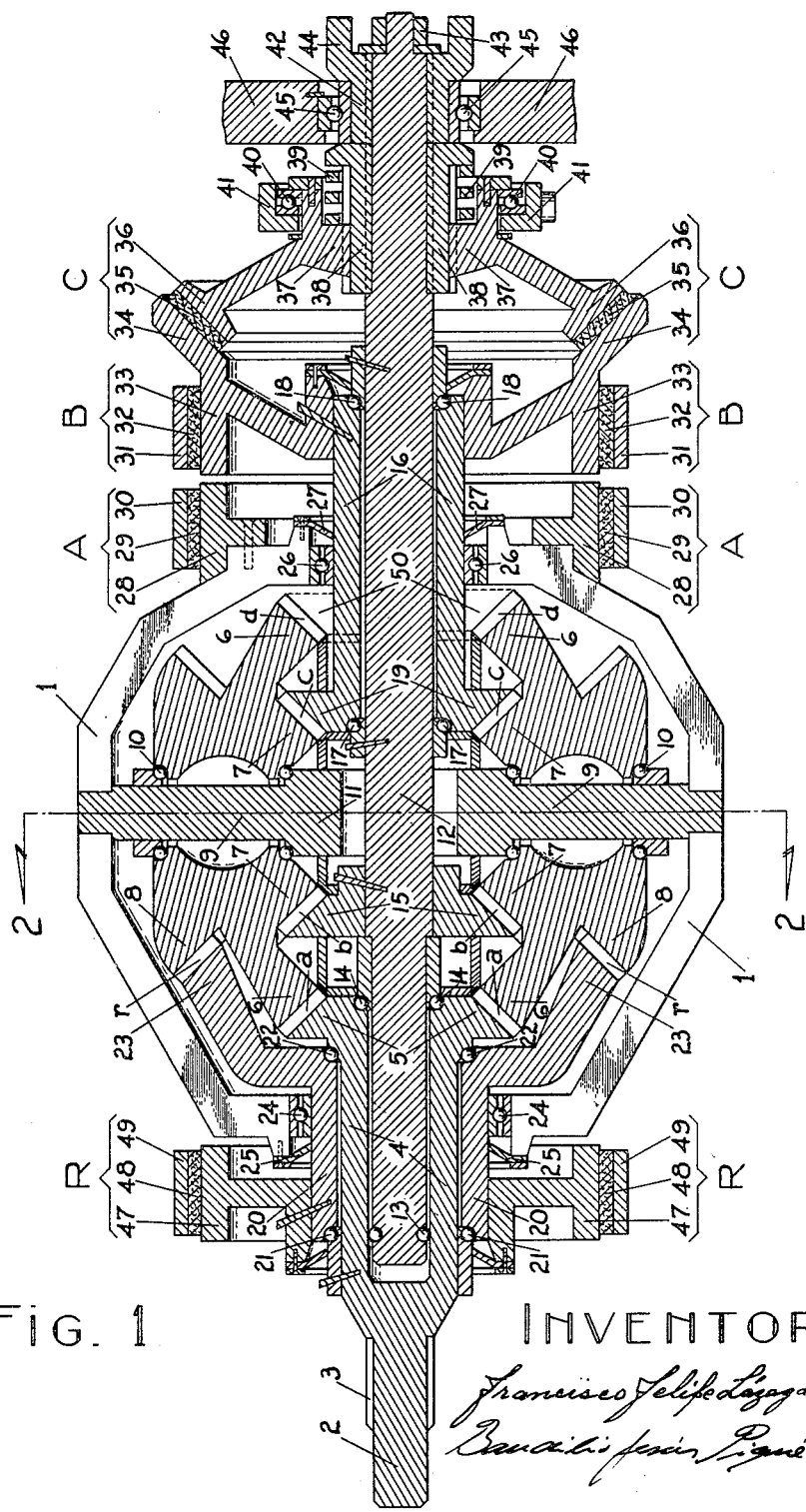
Fig. 1 shows a longitudinal section through a modality of the transmission device.
Figure 2:
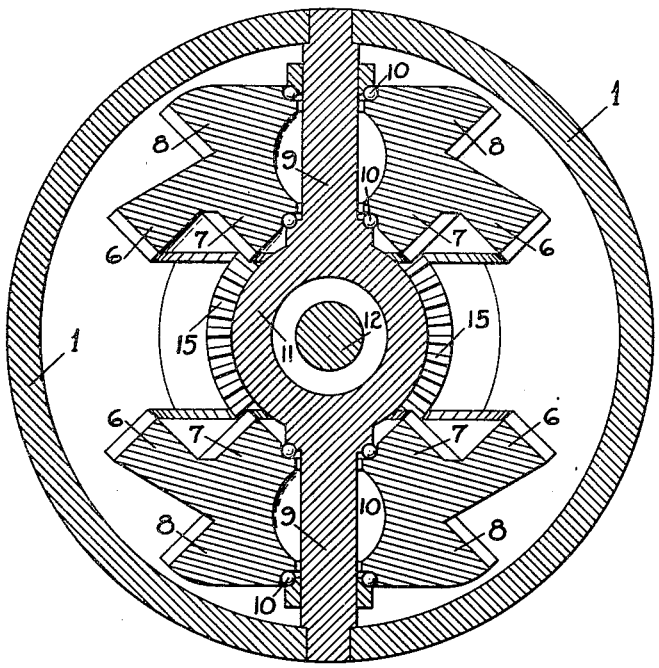
Fig. 2 is a cross-section through the line 2—2 of Fig. 1.

Referring to the drawings, numeral 1 is used to designate a rigid case of circular cross-section, Figs. 1, 2, 4, and 5; which is adapted to rotate about an axis carrying bevel gears rotatable on axes arranged either at right angles (Fig. 1), or oblique (Fig. 5) to said axis, as hereinafter set forth.

Numeral 2 is a driving shaft provided with splines 3 to be coupled to the motor shaft, not shown in the drawings.

A tubular extension 4 of the drive shaft 2, carries a bevel pinion 5 which is in gear at points $a$ to bevel gears 6. Other bevel gears 7 of lesser diameter are attached on the inner side of said bevel gears 6 for rotation therewith, and other bevel gears 8, whose diameter is intermediate between the diameters of the gears 6 and 7, are attached on the outer side of the gears 6 for rotation therewith.

Number 9 designates radial axles embedded at one of its ends in the case 1 and attached at its other end to a ring 11, Figs. 1, 2, 4 and 5, by which shaft 12 passes through extending into the tubular shaft 4 and supported therein by bearings 13 and 14.

A pinion 15, attached to the shaft 12, is in gear with gears 7 at points $b$.

The gearing points $a$ and $b$ are on the same side, with regard to axles 9.

Figure 4:
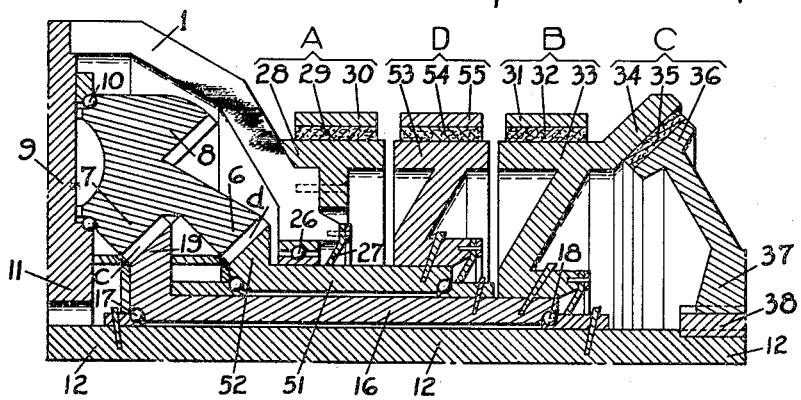
Fig. 4 shows another modality of the device shown in Fig. 1.

A tubular shaft 16 concentric with shaft 12 extending out case 1, independently rotatable upon said shaft 12 through sealed bearings 17 and 18, carries a bevel pinion 19 which is in gear with gears 7 at points $c$, at the opposite side of points $b$, with regard to radial axles 9, Figs. 1 and 4.

Figure 5:
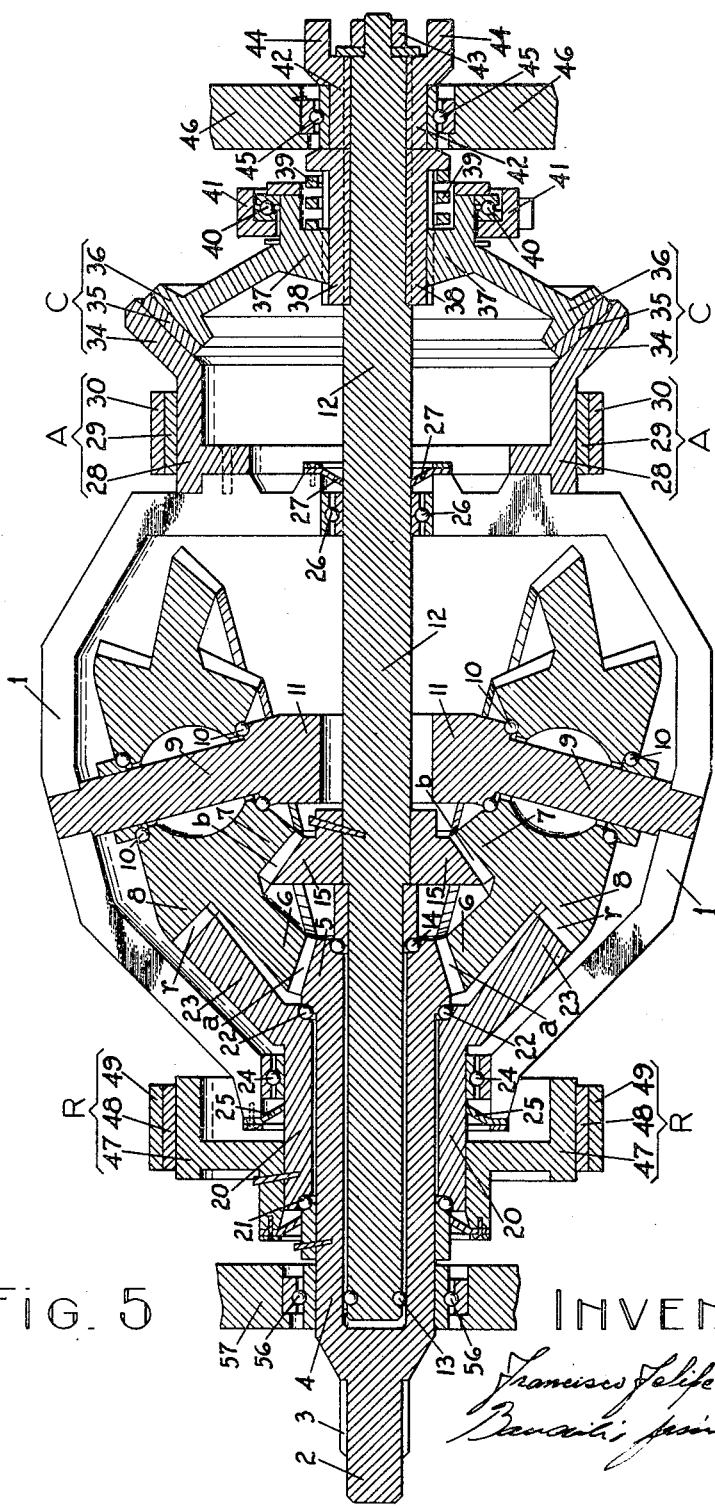
Fig. 5 represents another modality of the device shown in Fig. 1.

A tubular shaft 20 concentric with the tubular extension 4 of the drive shaft 2; is independently rotatable thereon through bearings 21 and 22, and carries a cup-shaped bevel gear 23, which is in gear with gears 8 at points $r$ on the same side of the gearing points $a$ and $b$, with regard to axles 9, Figs. 1 and 5.

At one end case 1 is supported upon tubular shaft 20 through a sealed bearing 24—25, to avoid leakage of any oil therein contained. At its other end said case 1 rests upon tubular shaft 16 through a sealed bearing 26—27, Fig. 1. In Figs. 4 and 5, which represent other modality of our invention, this end of case 1 rests respectively on shafts 51 and 12, through said sealed bearings 26—27.

A brake drum 28 attached to the case 1, may be engaged by a friction band 29 of a brake band 30, of a brake system, which may be mechanic, hydraulic, vacuum, etc., which we call brake A (Figs. 1, 4 and 5).

A brake friction band 32 with the brake band 31 of a brake system, which we shall call brake B, is used to hold the brake drum 33, which is attached to the tubular shaft 16. A tapered extension 34 of drum 33 forms one element of a cone clutch C. The other element of the clutch is formed by the friction band 35 and the cone 36, whose hub 37 slides upon splines along the collar 38, which is attached to the shaft 12 for rotation therewith, Figs. 1, 4 and 5.

The spring 39 acting upon the hub 37 does the clutching, which may be counteracted by the collar 41 through the bearing 40 acted upon by a lever not shown in the drawings.

A collar 42 held by splines upon shaft 12 and pressed against collar 38 by a nut 43, forms part of the universal joint 44, the whole being supported by the bearing 45 on the support 46.

A brake drum 47 keyed on the outer end of tubular shaft 20 is adapted to be engaged by the friction band 48 of the brake band 49 of a brake system, which we shall call brake R.

Pinion 19 may be supposed to be in mesh with gears 6 at points d, as shown by dotted lines in Fig. 1, forming a pinion 50, substitute for said pinion 19, keyed to tubular shaft 16.

Figure 3:
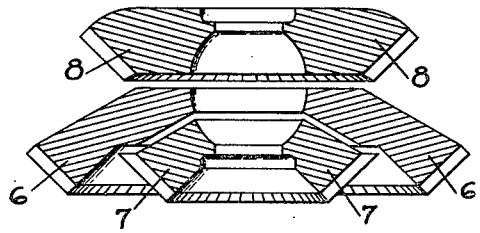
Fig. 3 shows a detail of construction.

Fig. 3 shows the construction of the compound gears 6—7—8, which are welded or otherwise joined together to form a solid body as shown in Figs. 1, 2, 4 and 5.

In Fig. 4 there has been added a tubular shaft 51 concentric with tubular shaft 16, extending out of case 1, and independently rotatable upon said shaft 16, through proper sealed bearings. This shaft 51 carries a bevel pinion 52 in meshing relation at points d with gears 6, and its outer end has keyed the hub of a brake drum 53, which is placed between the brake drums 28 and 33. Brake drum 53 is adapted to be engaged by the friction band 54 of the brake band 55 of a brake system, which we shall call brake D interposed to effect a third intermediate speed.

In the modality shown in Fig. 5, the radial axles 9 are oblique (to the effect of this patent it will be understood that they are at right angle) in relation to the axis of the shafts 2 and 12 in order to favor the difference in the pinions and gears diameters, also the gearing at c and d has been removed, the conic friction ring 34 of the clutch C has been attached to the drum 28 of the brake A. The whole transmission is supported on shaft 12, said shaft rests on support 46 and 57 by means of bearings 45 and 56.

Functioning

When the shaft 2, together with the extension 4 and the pinion 5 are running—supposing that the transmission case 1 is braked and with it, radial axles 9—the motion will be transmitted at gearing points a of the pinion 5 with the gears 6; and at gearing points b of the gears 7 with the pinion 15, causing the shaft 12 to turn in the same direction as the shaft 2, but with less speed and greater potential torque, on account of the difference in diameter of the pinions and gears, Figs. 1 and 5.

Supposing that the shaft 12 be still, and consequently its pinion 15 does not move, then gears 6 when receiving the stress from the pinion 5 will act as levers upon their axles 9, having as fulcrum the gearing points b on the gears 7 with the pinion 15, which is still, this will cause the radial axles 9 to revolve, causing the transmission case 1, to turn in opposite direction to the shaft 2. In this condition, if by means of the brake A, which acts upon the brake drum 28, the case 1 is being held, that is, its speed is being lowered without altering the speed of the shaft 2, we shall have that the difference of motion will be transmitted to the pinion 15, therefore to shaft 12. As the case 1 is being braked, the speed of the shaft 12 will increase until reaching the middle speed and power equivalent to "low," or first in the actual changes of speeds, Figs. 1 and 5.

When the case 1 is stationary, with the gears running, the pinion 19, together with the shaft 16 and the brake drum 33 will have motion opposite to that of the shaft 2. Releasing the case 1 from the brake A and applying the brake B on the drum 33, the inverse rotation of the whole 33—16—19 will be checked, Figs. 1 and 4. As the pinion 19 stops, it acts as fulcrum at gearing points c on the gears 7, the lever arms will be from the gearing points a to the gearing points c and from the gearing points b to the gearing points c thereby the speed of the pinion 15 together with the shaft 12 will increase until remaining in this intermediate speed with a multiplication of power equivalent to "second speed" in the actual changes of gear.

Calling D the diameter of the gears 6, and d the diameter of the gears 7, supposing that the diameters of the pinions 5 and 15 are equal, we shall have that the relation $$\frac{D}{d}$$

(speed ratio of the engine) will be the speed factor in the first speed.

When the whole 33—16—19, is held by the brake B, the gearing points c will act as fulcrum and the power factor will be:

$$\frac{\tfrac{1}{2}D+\tfrac{1}{2}d}{d}=\frac{D+d}{2d}=\frac{1}{2}\frac{D}{d}+\frac{1}{2}$$

Therefrom it is seen, that if the ratio $$\frac{D}{d}$$

is 2½ (in low), first speed; in second speed, it will be 1¾, rates corresponding to power factors actually used.

Supposing that the pinion 19 is placed in the position indicated by dotted lines with numeral 50, Fig. 1, and in gear with the gears 6 at the points d, remaining joined to the tubular shaft 16, we shall have that the power factor of the second speed will be:

$$\frac{D}{\tfrac{1}{2}d+\tfrac{1}{2}D}=\frac{2D}{D+d}=\frac{2\tfrac{D}{d}}{\tfrac{D}{d}+1}$$

As an example, if $$\frac{D}{d}$$

is equal to 3, in the second speed the power factor would be 1½.

When the pinions 5 and 15 are of different diameters, we shall have, calling P the diameter of the pinion 15, and p the diameter of the pinion 5, the following ratio:

$$\frac{DP}{dp}$$

which will be the power factor for first speed.

When the whole 33—16—19 has been held by brake B, having the gearing points c as a fulcrum, the power factor in this intermediate speed will be:

$$\frac{\tfrac{1}{2}P(\tfrac{1}{2}D+\tfrac{1}{2}d)}{\tfrac{1}{2}pd}=\frac{(D+d)P}{2dp}$$

Let S be the desired power factor for the first speed or low, and s the desired power factor for the second speed; the relation of the diameters (speed ratio) will be given by the following equations:

$$S=\frac{DP}{dp} \text{ and } s=\frac{(D+d)P}{2dp}$$

whereof $$\frac{S}{s}=\frac{2D}{D+d} \text{ hence } \frac{D}{d}=\frac{S}{2s-S} \qquad (1)$$

in Equation 1 we see that the value of $s$ must be comprised between the limits S and ½S.

Supposing that the pinion 19 is placed in the position indicated by dotted lines with numeral 50, Fig. 1, and in gear with the gears 6 at the points $d$, remaining joined to the tubular shaft 16; calling $t$ the speed factor in this second speed, we shall have that the equations which establish the speed ratio with the diameters or number of teeth of the pinions will be:

$$S=\frac{DP}{dp} \text{ and } t=\frac{2DP}{(D+d)p}$$

wherefrom $$\frac{S}{t}=\frac{D+d}{2d} \text{ hence } \frac{D}{d}=\frac{2S-t}{t} \quad (2)$$

in the Equation 2, $t$ may have all the values less than S which may be desired.

As a practical example; it is desired a speed in first speed from 2.5 to 1, and in second speed from 1.5 to 1.

$S=2.5$ $s=1.5 \quad \dfrac{D}{d}=\dfrac{2\times 2.5-1.5}{1.5}=2.335 \begin{cases} D=3\frac{1}{2}'' \text{ 70 teeth} \\ d=1\frac{1}{2}'' \text{ 30 teeth} \end{cases}$ $S=2.335\dfrac{P}{p}=2.5 \quad \dfrac{P}{p}=1.07 \begin{cases} P=1.6'' \text{ 32 teeth} \\ p=1\frac{1}{2}'' \text{ 30 teeth} \end{cases}$ If after releasing the brake B to leave free the drum 33, the clutch C is engaged, the whole 34—16—19 will turn in the same sense as the whole 35—36—37—38—12—15, causing the case 1 to turn with greater speed and therefore the speed of the shaft 12 will be increasing until the whole device forms a single body turning at the same speed and the motion will be transmitted directly from shaft 2 to the shaft 12, because all the gears and pinions will be fixed with relation to the case 1.

When the shaft 12 is at rest—the shaft 2 being running—the pinion 23 together with the tubular shaft 20 and the brake drum 47 will turn in the same sense as the shaft 2. If by means of the brake R the whole 47—20—23, Figs. 1 and 5, is being stopped; as the pinion 23 stops, this latter will act as a fulcrum at the points $r$ in gear with the gears 8, and the lever arms will be from the respective gearing point $a$ to the projection of the respective gearing point $r$ and from the respective gearing point $b$ to the projection of the respective gearing point $r$, making a lever with the fulcrum in the middle, therefore the pinion 15 will turn in opposite direction of the pinion 5 and with a multiplication of power equivalent to the ratio of the lever arms according to the difference of the diameters of the gears 6, 7 and 8.

Supposing that $m$ is the diameter of the gear 8, we shall have that $$\frac{D-m}{m-d}$$

is the speed factor in the reverse gear.

According to Fig. 4, when there are three intermediate speeds wherein the brake A serves to stop the case 1 together with the shaft 9, constituting the first speed gearing; the brake B, which stops the whole 33—16—19 constituting the second speed gearing; the brake D which stops the motion of the tubular shaft 51 and pinion 52 constituting a third intermediate speed.

The ratio of the diameters of the pinions for these three intermediate speeds, we had that were:

$$S=\frac{DP}{dp} \text{ (speed ratio in first)}$$

$$s=\frac{(D+d)P}{2dp} \text{ (speed ratio in second)}$$

$$t=\frac{2DP}{(D+d)p} \text{ (speed ratio in third)}$$

Solving the three equations in functions of S, $s$ and $t$, we shall have:

$$\frac{D}{d}=\frac{S^2}{st} \quad (3$$

In Equation 3, we see, that the value of S squared must be greater than the product of $s$ by $t$, at the same time, we saw that the values of $s$ and $t$ must be comprised between the values S and ½S, for the former and any value less than S for the second one.

As a practical example: it is desired, in "first" a speed of 3 to 1, in "second" of 2½ to 1, and in "third" of 2 to 1.

$$S=3 \quad s=2\frac{1}{2} \quad t=2$$

$\dfrac{D}{d}=\dfrac{3^2}{2\frac{1}{2}\times 2}=1.8 \begin{cases} D=4\frac{1}{2}'' \text{ 81 teeth} \\ d=2\frac{1}{2}'' \text{ 45 teeth} \end{cases}$ $S=1.8\dfrac{P}{p}=3 \quad \dfrac{P}{p}=1.666 \begin{cases} P=3\frac{1}{2}'' \text{ 70 teeth} \\ p=2.1'' \text{ 42 teeth} \end{cases}$

We claim:

1. In a differential transmission the combination of a drive shaft, a transmission shaft laid in the same axis as the drive shaft, supporting means applied at two points within the length of the transmission shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, all meshings being at same side of their axes of rotation, a brake drum attached on the outside of the transmission case, a brake band adapted to act upon the brake drum for releasably holding the transmission case stationary against any rotation for effecting low speed drive.

2. In a differential transmission the combination of a drive shaft, a transmission shaft laid in the same axis as the drive shaft, supporting means applied at two points within the length of the transmission shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, all meshings being at same side of their axes of rotation, a clutch member attached to the transmission case, and another clutch member longitudinally slidable on the transmission shaft keyed for rotation therewith and adapted to engage the first mentioned clutch member for connecting the transmission case with the transmission shaft for direct drive of the transmission shaft with the drive shaft.

3. In a differential transmission the combination of a drive shaft, a transmission shaft laid in the same axis as the drive shaft, supporting means applied at two points within the length of the transmission shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, all meshings being at same side of their axes of rotation, a brake drum attached on the outside of the transmission case, a brake band adapted to act upon the brake drum for releasably holding the transmission case stationary against any rotation for effecting low speed drive, a clutch member integrally attached to the brake drum, and another clutch member longitudinally slidable on the transmission shaft keyed for rotation therewith and adapted to engage the first mentioned clutch member for connecting the transmission case with the transmission shaft for direct drive of the transmission shaft with the drive shaft.

4. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the largest of said bevel gears for drive of the same, a bevel pinion carried by the transmission shaft in meshing relation with the smallest of said bevel gears, all meshings being at same side of their axes of rotation, a tubular shaft independently rotatable on the drive shaft extending out the transmission case, a cup-shaped bevel gear carried by the tubular shaft in meshing relation with the middle size of the above mentioned bevel gears, a brake drum keyed on the outer end of the tubular shaft, a brake band adapted upon the latter named brake drum for holding the tubular shaft stationary against any rotation its cup-shaped bevel gear in stationary relation with the middle size bevel gears for accomplishing reverse drive of the transmission shaft.

5. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outside of the first bevel gears for rotation therewith, a bevel pinion carried by the drive shaft in meshing relation with the largest of said bevel gears for drive of the same, a bevel pinion carried by the transmission shaft in meshing relation with the smallest of said bevel gears, all meshings being at same side of their axes of rotation, a tubular shaft independently rotatable on the drive shaft extending out the transmission case, a cup-shaped bevel gear carried by the tubular shaft in meshing relation with the middle size of the above mentioned bevel gears, a brake drum keyed on the outer end of the tubular shaft, a brake band adapted upon the latter named brake drum for holding the tubular shaft stationary against any rotation its cup-shaped bevel gear in stationary relation with the middle size bevel gears for accomplishing reverse drive of the transmission shaft, a brake drum attached on the outside of the transmission case, a brake band adapted for acting upon said brake drum for releasably holding the transmission case stationary against any rotation for effecting low speed drive.

6. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the largest of said bevel gears for drive of the same, a bevel pinion carried by the transmission shaft in meshing relation with the smallest of said bevel gears, all meshings at same side of their axes of rotation, a tubular shaft independently rotatable on the drive shaft extending out the transmission case, a cup-shaped bevel gear carried by the tubular shaft in meshing relation with the middle size of the above mentioned bevel gears, a brake drum keyed on the outer end of the tubular shaft, a brake band adapted upon the latter named brake drum for holding the tubular shaft stationary against any rotation its cup-shaped bevel gear in stationary relation with the middle size bevel gears for accomplishing reverse drive of the transmission shaft, a clutch member attached on the transmission case, and another clutch member longitudinally slidable on the transmission shaft keyed for rotation therewith and adapted to engage the first named clutch member for causing an interlock of the entire gearing for effecting direct drive with said drive shaft.

7. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the largest of said bevel gears for drive of the same, a bevel pinion carried by the transmission shaft in meshing relation with the smallest of said bevel gears, all meshings being at same side of their axes of rotation, a tubular shaft independently rotatable on the drive shaft extending out the transmission case, a cup-shaped bevel gear carried by the tubular shaft in meshing relation with the middle size of the above mentioned bevel gears, a brake drum keyed on the outer end of the tubular shaft, a brake band adapted upon the latter named brake drum for holding the tubular shaft stationary against any rotation its cup-shaped bevel gear in stationary relation with the middle size bevel gears for accomplishing reverse drive of the transmission shaft, a brake drum attached on the outside of the transmission case, a brake band adapted for acting upon said brake drum for releasably holding the transmission case stationary against any rotation for effecting low speed drive, a clutch member preferably integral with the brake drum attached on the transmission case, and another clutch member longitudinally slidable on the transmission shaft keyed for rotation therewith and adapted to engage the first named clutch member for causing an interlock of the entire gearing for effecting direct drive with said drive shaft.

8. In a differential transmission the combination of a drive shaft, a transmission shaft laid in the same axis as the drive shaft, a transmission case independently rotatable on the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, all meshings being at same side of their axes of rotation, a brake drum attached on the outside of the transmission case, a brake band adapted upon said brake drum for releasably holding the transmission case stationary against any rotation for effecting low speed drive, a tubular shaft independently rotatable upon the transmission shaft, a bevel pinion carried by the tubular shaft in engagement with the small bevel gears or the large bevel gears at the opposite side of their axes of rotation with regard to the above mentioned meshings, a brake drum keyed on the outer end of the tubular shaft, a brake band adapted upon the latter mentioned brake drum for releasably holding the tubular shaft stationary against any rotation for effecting an intermediate speed drive, a clutch member integral with the brake drum keyed on the outer end of the tubular shaft, and another clutch member longitudinally slidable on the transmission shaft keyed for rotation therewith and adapted for engagement with the first clutch member for connecting the tubular shaft with the transmission shaft causing an interlock of the entire gearing for effecting direct drive of the transmission shaft with the drive shaft.

9. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gear for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the bevel gears of middle diameter, all meshings being at the same side of their axes of rotation, a brake drum keyed on the outer end of the tubular shaft, a brake band adapted upon the latter named brake drum for releasably holding said tubular shaft stationary against any rotation for holding the cup-shaped bevel gear in stationary relation with the bevel gears of middle diameter for effecting reverse drive of the transmission shaft, a tubular shaft independently rotatable upon the transmission shaft extending out the transmission case, a bevel pinion carried by the latter tubular shaft in engagement with the small bevel gears or with the large bevel gears at the opposite side of the other bevel pinions, a brake drum keyed on the outer end of the latter mentioned tubular shaft, a brake band adapted upon the latter brake drum for effecting a forward speed drive.

10. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the bevel gears of middle diameter, all meshing being at same side of their axes of rotation, a brake drum keyed on the outer end of the tubular shaft, a brake band adapted upon the latter named brake drum for releasably holding said tubular shaft stationary against any rotation for holding the cup-shaped bevel gear in stationary relation with the bevel gear of middle diameter for effecting reverse drive of the transmission shaft, a brake drum attached on the outside of the transmission case, a brake band adapted for acting upon said brake drum for releasably holding the transmission case stationary against any rotation for effecting low speed drive, a tubular shaft independently rotatable upon the transmission shaft extending out the transmission case, a bevel pinion carried by the latter tubular shaft in engagement with the small bevel gears or with the large bevel gears at the opposite side of the other bevel pinions, a brake drum keyed on the outer end of the latter mentioned tubular shaft, a brake band adapted upon the latter brake drum for effecting a second speed drive.

11. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gear for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the bevel gears of middle diameter, all meshings being at same side of their axes of rotation, a brake drum keyed on the outer end of the tubular shaft, a brake band adapted upon the latter named brake drum for releasably holding said tubular shaft stationary against any rotation for holding the cup-shaped bevel gear in stationary relation with the bevel gears of middle diameter for effecting reverse drive of the transmission shaft, a tubular shaft independently rotatable upon the transmission shaft extending out the transmission case, a bevel pinion carried by the latter tubular shaft in engagement with the small bevel gears or with the large bevel gears at the opposite side of the other bevel pinions, a brake drum keyed on the outer end of the latter mentioned tubular shaft, a brake band adapted upon the latter brake drum for effecting a forward speed drive, a clutch member integral with the brake drum keyed on the tubular shaft rotatable upon the transmission shaft, and another clutch member longitudinally slidable upon said transmission shaft keyed for rotation therewith and adapted for engagement with the first clutch member for causing an interlock of the entire gearing for effecting direct drive of the transmission shaft with the drive shaft.

12. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first gears for rotation therewith, bevel gears of diameter intermediate between the diameters of the first and the second bevel gears attached on the outer side of the first bevel gear for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the bevel gears of middle diameter, all meshing being at same side of their axes of rotation, a brake drum keyed on the outer end of the tubular shaft, a brake band adapted upon the latter named brake drum for releasably holding said tubular shaft stationary against any rotation for holding the cup-shaped bevel gear in stationary relation with the bevel gears of middle diameter for effecting reverse drive of the transmission shaft, a brake drum attached on the outside of the transmission case, a brake band adapted for acting upon said brake drum for releasably holding the transmission case stationary against any rotation for effecting low speed drive, a tubular shaft independently rotatable upon the transmission shaft extending out the transmission case, a bevel pinion carried by the latter tubular shaft in engagement with the small bevel gears or with the large bevel gears at the opposite side of the other bevel pinions, a brake drum keyed on the outer end of the latter mentioned tubular shaft, a brake band adapted upon the latter brake drum for effecting an intermediate speed drive, a clutch member integral with the brake drum keyed on the tubular shaft rotatable upon the transmission shaft, and another clutch member longitudinally slidable upon said transmission shaft keyed for rotation therewith and adapted for engagement with the first clutch member for causing an interlock of the entire gearing for effecting direct drive of the transmission shaft with the drive shaft.

13. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, these meshings being at same side of their axes of rotation, a tubular shaft independently rotatable on the transmission shaft extending out the transmission case, a bevel pinion carried by the tubular shaft in meshing relation with the small bevel gears at the opposite side of the other bevel pinions, a brake drum keyed on the outer end of the tubular shaft, a brake band adapted upon the latter brake drum for releasably holding the tubular shaft stationary against any rotation for establishing stationary relation of its bevel gear for effecting a low forward speed drive; another tubular shaft independently rotatable upon the first tubular shaft extending out the transmission case, a bevel pinion carried by the second tubular shaft in meshing relation with the large bevel gears also at the opposite side of their axes of rotation, a brake drum keyed on the outer end of the second tubular shaft, a brake band adapted upon the latter brake drum for holding the second tubular shaft stationary against any rotation for establishing stationary relation of its bevel pinion with the large bevel gears for effecting a high forward speed drive.

14. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, these meshings being at same side of their axes of rotation, a brake drum attached on the outside of the transmission case, a brake band adapted upon said brake drum for holding the transmission case stationary against any rotation for effecting low speed drive, a tubular shaft independently rotatable on the transmission shaft extending out the transmission case, a bevel pinion carried by the tubular shaft in meshing relation with the small bevel gears at the opposite side of the other bevel pinions, a brake drum keyed on the outer end of the tubular shaft, a brake band adapted upon the latter brake drum for releasably holding the tubular shaft stationary against any rotation for establishing stationary relation of its bevel gear for effecting second speed drive; another tubular shaft independently rotatable upon the first tubular shaft extending out the transmission case, a bevel pinion carried by the second tubular shaft in meshing relation with the large bevel gears also at the opposite side of their axes of rotation, a brake drum keyed on the outer end of the second tubular shaft, a brake band adapted upon the latter brake drum for holding the second tubular shaft stationary against any rotation for establishing stationary relation of its bevel pinion with the large bevel gears for effecting a third speed drive.

15. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, these meshings being at same side of their axes of rotation, a tubular shaft independently rotatable on the transmission shaft extending out the transmission case, a bevel pinion carried by the tubular shaft in meshing relation with the small bevel gears at the opposite side of the other bevel pinions, a brake drum keyed on the outer end of the tubular shaft, a brake band adapted upon the latter brake drum for releasably holding the tubular shaft stationary against any rotation for establishing stationary relation of its bevel gears for effecting a low speed drive; another tubular shaft independently rotatable upon the first tubular shaft extending out the transmission case, a bevel pinion carried by the second tubular shaft in meshing relation with the large bevel gears also at the opposite side of their axes of rotation, a brake drum keyed on the outer end of the second tubular shaft, a brake band adapted upon the latter brake drum for holding the second tubular shaft stationary against any rotation, establishing stationary relation of its bevel pinion with the large bevel gears for effecting an intermediate speed drive, a clutch member integral with the brake drum keyed to the outer end of the first tubular shaft, and the other clutch member longitudinally slidable on the transmission shaft keyed for rotation therewith adapted to engage the first clutch member for connecting the transmission shaft with the first tubular shaft causing an interlock of the entire gearing for direct drive of the transmission shaft with the drive shaft.

16. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, a bevel pinion carried by the drive shaft in meshing relation with the large bevel gears for drive of the same, a bevel pinion carried by the transmission shaft in meshing relation with the small bevel gears, these meshings being at same side of their axes of rotation, a brake drum attached on the outside of the transmission case, a brake band adapted for acting upon said brake drum for holding the transmission case stationary against any rotation for effecting low speed drive, a tubular shaft independently rotatable on the transmission shaft extending out the transmission case, a bevel pinion carried by the tubular shaft in meshing relation with the small bevel gears at the opposite side of the other bevel pinions, a brake drum keyed on the outer end of the tubular shaft, a brake band adapted for acting upon the latter brake drum for releasably holding the tubular shaft stationary against any rotation for establishing stationary relation of its bevel gears for effecting second speed drive; another tubular shaft independently rotatable upon the first tubular shaft extending out the transmission case, a bevel pinion carried by the second tubular shaft in meshing relation with the large bevel gears also at the opposite side of their axes of rotation, a brake drum keyed on the outer end of the second tubular shaft, a brake band adapted for acting upon the latter brake drum for holding the second tubular shaft stationary against any rotation for establishing stationary relation of its bevel pinion with the large bevel gears for effecting a third intermediate speed drive, a clutch member integral with the brake drum keyed to the outer end of the first tubular shaft, and the other clutch member longitudinally slidable on the transmission shaft keyed for rotation therewith and adapted to engage the first clutch member for connecting the transmission shaft with the first tubular shaft causing an interlock of the entire gearing for direct drive of the transmission shaft with the drive shaft.

17. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the middle diameter bevel gears, these meshings being at same side of their axes of rotation, a brake drum keyed on the outer end of the tubular shaft, a brake band adapted for acting upon said brake drum for releasably holding the tubular shaft stationary against any rotation for establishing stationary relation of the cup-shaped bevel gear with the middle diameter bevel gears for effecting reverse drive of the transmission shaft, a tubular shaft independently rotatable upon the transmission shaft extending out the transmission case, a bevel pinion carried by this tubular shaft in meshing relation with the small bevel gears, a brake drum keyed on the outer end of this latter tubular shaft, a brake band adapted for acting upon this brake drum for releasably holding this tubular shaft stationary against any rotation to establish stationary relation of its bevel pinion with the small bevel gears for effecting a low forward speed drive, a tubular shaft independently rotatable on the latter tubular shaft extending out the transmission case, a bevel pinion carried by this tubular shaft in meshing relation with the large bevel gears, a brake drum keyed on the outer end of this latter tubular shaft, a brake band adapted for acting upon the latter brake drum for holding the latter tubular shaft stationary against any rotation thus establishing a stationary relation of its bevel pinion with the large bevel gears for effecting a high forward speed drive.

18. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the middle diameter bevel gears, these meshings being at same side of their axes of rotation, a brake drum keyed on the outer end of the tubular shaft, a brake band adapted for acting upon said brake drum for releasably holding the tubular shaft stationary against any rotation for establishing stationary relation of the cup-shaped bevel gear with the middle diameter bevel gears for effecting reverse drive of the transmission shaft, a brake drum attached on the outside of the transmission case, a brake band adapted for acting upon this brake drum for holding the transmission case stationary against any rotation for effecting low speed drive, a tubular shaft independently rotatable upon the transmission shaft extending out the transmission case, a bevel pinion carried by this tubular shaft in meshing relation with the small bevel gears, a brake drum keyed on the outer end of this latter tubular shaft, a brake band adapted for acting upon this brake drum for releasably holding this tubular shaft stationary against any rotation to establish stationary relation of its bevel pinion with the small bevel gears for effecting second speed drive, a tubular shaft independently rotatable on the latter tubular shaft extending out the transmission case, a bevel pinion carried by this tubular shaft in meshing relation with the large bevel gears, a brake drum keyed on the outer end of this latter tubular shaft, a brake band adapted for acting upon the latter brake drum for holding the latter tubular shaft stationary against any rotation thus establishing a stationary relation of its bevel pinion with the large gears for effecting a third speed drive.

19. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the middle diameter bevel gears, these meshings being at same side of their axes of rotation, a brake drum keyed on the outer end of the tubular shaft, a brake band adapted for acting upon said brake drum for releasably holding the tubular shaft stationary against any rotation for establishing stationary relation of the cup-shaped bevel gears with the middle diameter bevel gears for effecting reverse drive of the transmission shaft, a tubular shaft independently rotatable upon the transmission shaft extending out the transmission case, a bevel pinion carried by this tubular shaft in meshing relation with the small bevel gears, a brake drum keyed on the outer end of this latter tubular shaft, a brake band adapted for acting upon the brake drum for releasably holding this tubular shaft stationary against any rotation to establish stationary relation of its bevel pinion with the small bevel gears for effecting a low speed drive, a tubular shaft independently rotatable on the latter tubular shaft extending out the transmission case, a bevel pinion carried by this tubular shaft in meshing relation with the large bevel gears, a brake drum keyed on the outer end of this latter tubular shaft, a brake band adapted for acting upon the latter mentioned brake drum for holding the latter tubular shaft stationary against any rotation thus establishing a stationary relation of its bevel pinion with the large bevel gears for effecting an intermediate speed drive, a clutch member integral with the brake drum of the tubular shaft whose pinion is in mesh with the small bevel gears, and the other clutch member longitudinally slidable upon the transmission shaft keyed for rotation therewith and adapted for engagement with the first clutch member for connecting the transmission shaft with said tubular shaft causing an interlock of the entire gearing for effecting direct drive of the transmission shaft with the drive shaft.

20. In a differential transmission the combination of a drive shaft, a transmission shaft laid in the same axis as the drive shaft, a transmission case independently rotatable upon the shafts, bevel gears rotatable in the transmission case on axes arranged at right angle to the axis of the shafts, bevel gears of lesser diameter attached on the inner side of the first bevel gears for rotation therewith, bevel gears of diameter intermediate between the diameters of the first and the second bevel gears attached on the outer side of the first bevel gears for rotation therewith, a bevel pinion carried by the drive shaft in meshing relation with the large bevel gears for drive of the same, a bevel pinion carried by the transmission shaft in meshing relation with the small bevel gears, a tubular shaft independently rotatable upon the drive shaft extending out the transmission case, a cup-shaped bevel gear carried by the tubular shaft in meshing relation with the middle diameter bevel gears, these meshings being at same side of their axes of rotation, a brake drum keyed on the outer end of the tubular shaft, a brake band adapted for acting upon said brake drum for releasably holding the tubular shaft stationary against any rotation for establishing stationary relation of the cup-shaped bevel gear with the middle diameter bevel gears for effecting reverse drive of the transmission shaft, a brake drum attached on the outside of the transmission case, a brake band adapted for acting upon this brake drum for holding the transmission case stationary against any rotation for effecting low speed drive, a tubular shaft independently rotatable upon the transmission shaft extending out the transmission case, a bevel pinion carried by this tubular shaft in meshing relation with the small bevel gears, a brake drum keyed on the outer end of this latter tubular shaft, a brake band adapted for acting upon this brake drum for releasably holding this tubular shaft stationary against any rotation to establish stationary relation of its bevel pinion with the small bevel gears for effecting second speed drive, a tubular shaft independently rotatable on the latter tubular shaft extending out the transmission case, a bevel pinion carried by this tubular shaft in meshing relation with the large bevel gears, a brake drum keyed on the outer end of this latter tubular shaft, a brake band adapted for acting upon the latter brake drum for holding the latter tubular shaft stationary against any rotation thus establishing a stationary relation of its bevel pinion with the large bevel gears for effecting a third intermediate speed drive, a clutch member integral with the brake drum of the tubular shaft whose pinion is in mesh with the small bevel gears, and the other clutch member longitudinally slidable upon the transmission shaft keyed for rotation therewith and adapted for engaging the first clutch member for connecting the transmission shaft with said tubular shaft causing an interlock of the entire gearing for effecting direct drive of the transmission shaft with the drive shaft.

FRANCISCO FELIPE LÁZAGA GIROUD.
BAUDILIO JESÚS PIQUÉ GIROUD.